March 31, 1959     A. J. PÁRRAGA     2,879,811

BEVERAGE MAKER AND DISPENSER

Filed Aug. 6, 1958     7 Sheets-Sheet 1

INVENTOR
A. J. Parraga
BY John N. Randolph
ATTORNEY

March 31, 1959     A. J. PÁRRAGA     2,879,811

BEVERAGE MAKER AND DISPENSER

Filed Aug. 6, 1958     7 Sheets-Sheet 4

INVENTOR
A. J. Parraga
BY John N. Randolph
ATTORNEY

March 31, 1959 A. J. PÁRRAGA 2,879,811
BEVERAGE MAKER AND DISPENSER
Filed Aug. 6, 1958 7 Sheets-Sheet 5

INVENTOR
A. J. Parraga
BY John K. Randolph
ATTORNEY

March 31, 1959     A. J. PÁRRAGA     2,879,811
BEVERAGE MAKER AND DISPENSER Filed Aug. 6, 1958     7 Sheets-Sheet 6

INVENTOR
A. J. Parraga
BY John N. Randolph
ATTORNEY

United States Patent Office 2,879,811
Patented Mar. 31, 1959

2,879,811
BEVERAGE MAKER AND DISPENSER
Alfredo J. Párraga, Havana, Cuba
Application August 6, 1958, Serial No. 753,524
17 Claims. (Cl. 141—82)

This invention relates to an apparatus of unique construction for making or compounding a beverage from water and a beverage product in dry form and for automatically dispensing the beverage thus produced into a drinking receptacle, which receptacle when filled is available for removal from the apparatus.

Another object of the invention is to provide an apparatus including means for automatically furnishing disposable drinking receptacles to a position to be filled with the beverage, the operation of which is synchronized with the compounding of the beverage whereby a drinking receptacle will always be disposed in a position to receive the dispensed beverage.

A further object of the invention is to provide intermittently operated conveyor means for moving holders initially to a first station to be charged wtih the dry beverage product and thereafter to a second station to be coupled to a water discharger and to combine therewith to form an infuser.

A further object of the invention is to provide a beverage making and dispensing apparatus having a synchronizing unit which is electrically operated for synchronizing operation of the various parts required to produce and supply the beverage in a drinking receptacle available for removal from the apparatus.

A further object of the invention is to provide an electrically operated synchronizing unit capable of being actuated to accomplish a complete beverage making and dispensing cycle of operation of the apparatus by the deposit of a coin in the apparatus.

A further object of the invention is to provide an apparatus having means automatically actuated as a part of the cycle of operation thereof for cleansing the parts of the apparatus in which the beverage is produced and dispensed whereby said apparatus will at all times be maintained in a clean and sanitary condition.

Various other objects and advantages of the invention will hereinafter become more fully apparent from the following description of the drawings, illustrating presently preferred embodiments thereof, and wherein.

Referring more specifically to the drawings, the beverage making and dispensing apparatus in its entirety is designated generally 20 and includes an upright cabinet 21, in which the apparatus is housed. The cabinet 21 has a front wall 22 which is swingably supported by hinges 23, to afford access to the interior of said cabinet, and which front wall is normally retained in a closed position by any conventional latch structure 24.

Figure 2:
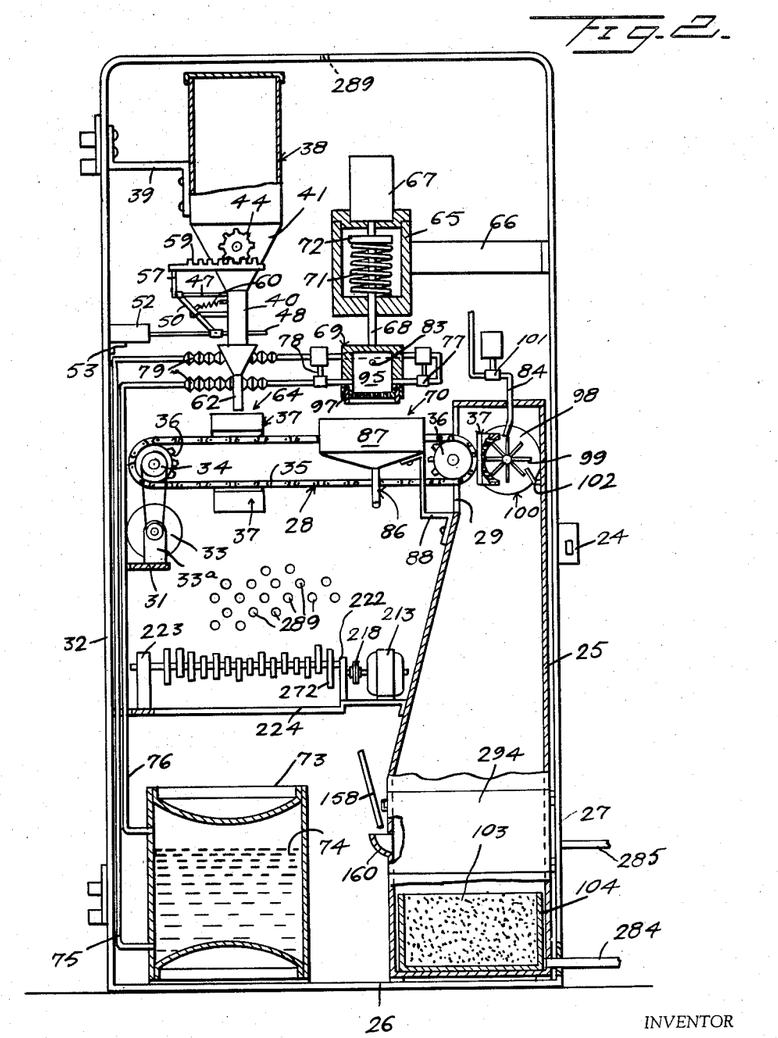
Figure 2 is an enlarged elevational view, partly in vertical section, looking into the front of the cabinet of the apparatus, with said front wall, and the parts carried thereby, removed.
Figure 4:
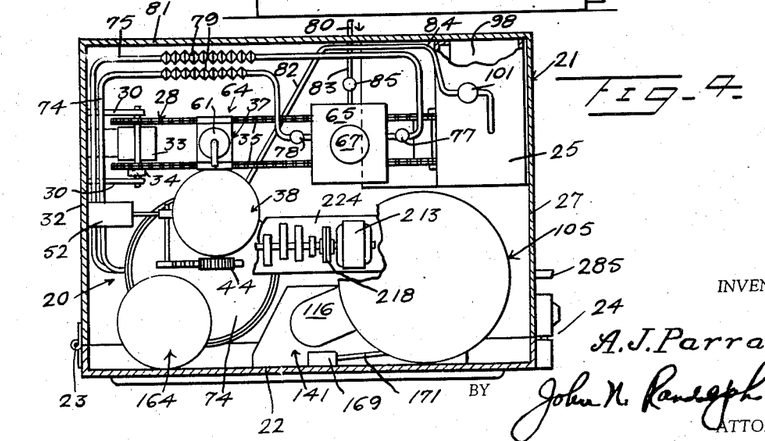
Figure 4 is an enlarged fragmentary horizontal sectional view, partly broken away, taken substantially along a plane as indicated by the line 4—4 of Figure 1.

Referring to Figure 2, a substantial part of the beverage making apparatus is supported by and housed within the main body portion of the cabinet 21, including an upright waste receptacle 25 which is supported on the cabinet bottom 26, adjacent the cabinet side wall 27, and which extends to a considerable height within the cabinet. An endless conveyor 28 is disposed with the cabinet crosswise thereof and in substantially a horizontal plane. One end of the endless conveyor 28 is supported by bearing means 30a which are secured to an upper part of the waste receptacle 25 and said end of the conveyor extends through an opening 29 of receptacle 25. The other end of said endless conveyor is supported by bearing means 30 which extend inwardly from the side wall 32, as seen in Figure 4. A supporting bracket 31 is also secured to wall 32 and supports an electric motor 33 and a magnetic clutch and brake means 33a beneath said last mentioned end of the endless conveyor 28. The motor 33 is connected to the conveyor 28 by the magnetic clutch and brake means 33a and a belt and pulley drive 34 for intermittently driving the endless conveyor with its upper flight moving from left to right, as seen in Figure 2. The endless conveyor 28 preferably comprises laterally spaced chains 35 which are trained over sprocket wheels 36 and which support a plurality of longitudinally spaced strainer members 37 which are disposed on the outer sides of and secured to the chains 35.

Figures 5, 6, 7:
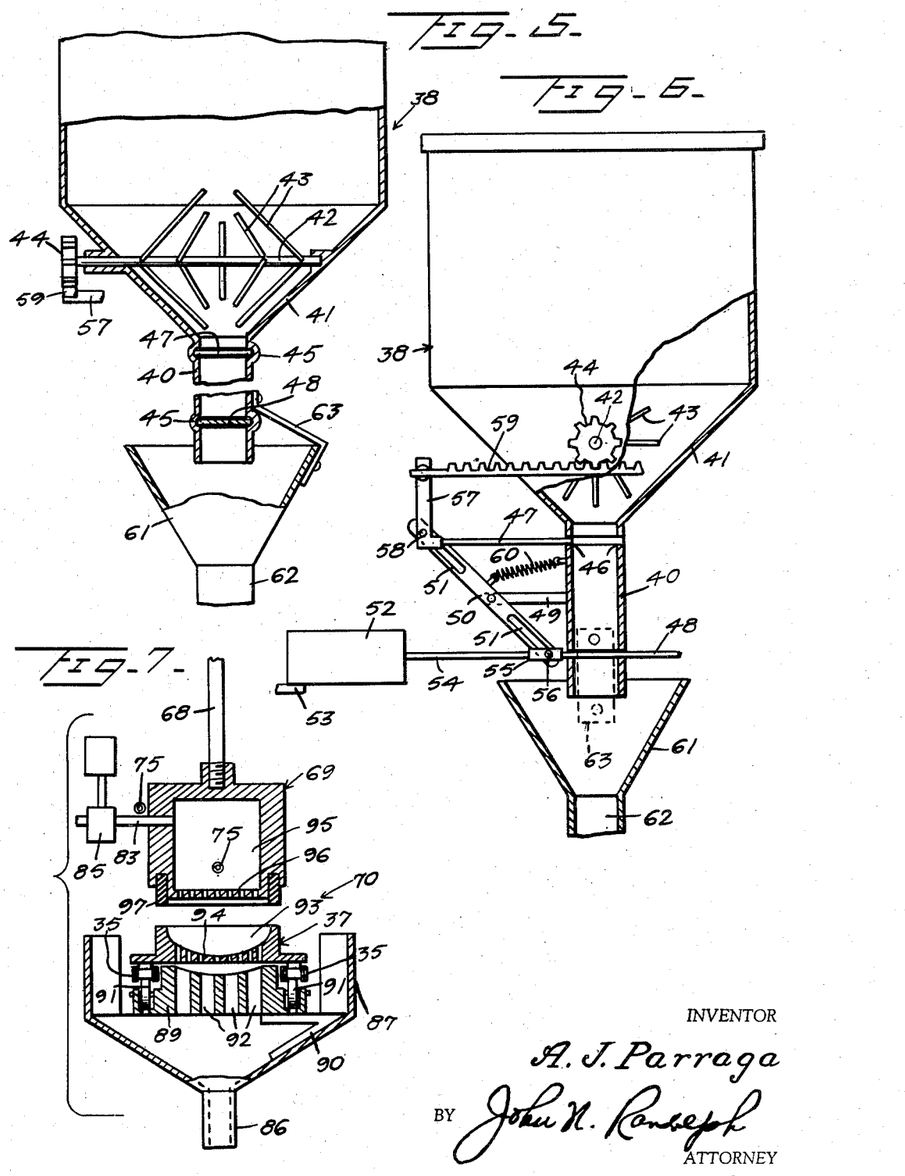
Figure 5 is an enlarged fragmentary vertical sectional view, partly in elevation, of a part of the apparatus.
Figure 6 is a view similar to Figure 5 looking from left to right of Figure 5.
Figure 7 is an enlarged fragmentary cross sectional view taken through another part of the apparatus.

A container or hopper 38 is disposed in the upper part of the cabinet 21 and is supported by a bracket 39, which is secured to the cabinet wall 32. As best seen in Figures 5 and 6, the hopper 38 has a restricted downwardly opening tubular outlet 40 extending downwardly from a tapered bottom portion 41 of said hopper. A shaft 42 extends transversely through and is journaled in the bottom 41 and supports a plurality of rods or fingers 43 which extend laterally therefrom and which provide agitators disposed within the hopper bottom 41. A ratchet wheel 44 is fixed to one end of the shaft 42 and is disposed externally of the hopper 38.

The hopper outlet tube 40 has vertically spaced enlargements 45 provided with oppositely disposed slots 46. Upper and lower slide valves 47 and 48, respectively, extend slidably through the aligned upper and lower slots 46. An arm 49 is fixed to and extends laterally from the tube 40, between the valves 47 and 48, as seen in Figure 6, and a lever 50 is pivotally mounted intermediate of its ends on the outer end of the arm 49 and has longitudinally extending slots 51 in the end portions thereof. A solenoid 52 is supported by a bracket 53 which is connected to the wall 32. An armature 54 extends inwardly from the solenoid and is coupled to an adjacent end of the lower valve 48 by a coupling 55 having a laterally extending pin 56 which slidably engages the lower slot 51 of the lever 50. The corresponding end of the upper valve 47 is fixed to the shorter leg of an L-shape member 57, which is supported by said valve and which has a laterally extending pin 58 slidably engaging in the other upper lever slot 51. A rack 59 is fixed to and projects from the upper end of the member 57 and is supported thereby with the teeth of said rack engaging the ratchet wheel 44. A pull spring 60 is anchored to the tube 40 and is connected to the lever 50, above the arm 49, for urging said lever to rock clockwise as seen in Figure 6, and from its position of Figure 6, for moving the upper valve 47 to a closed position across the tube 40, corresponding to the position of the lower valve 48 in Figure 6, and to simultaneously move the lower valve 48 to an open position, corresponding to the position of the upper valve 47 as shown in Figure 6.

The tube 40 discharges into the flared upper end 61 of a conduit 62. A bracket 63 connects the tube 40 and conduit portion 61 for rigidly suspending the conduit beneath the hopper 38. The lower end of the conduit 62 opens above a part of the endless conveyor 28, as seen in Figure 2, and at a first dwell position or station 64 of said endless conveyor, constituting a stopping point for each strainer member 37, which strainer members are intermittently moved.

A housing member 65 is disposed above a part of the endless conveyor 28 and is supported by a bracket 66, which may be secured to the cabinet wall 27, above the waste receptacle 25. A solenoid 67 is supported on the upper end of the housing 65 and has an armature 68 extending downwardly through and reciprocably disposed in said housing 65. A discharge head 69 is secured to and suspended by the lower end of the armature 68 above a part of the upper flight of the endless conveyor 28, between the first station 64 and the upper end of the waste receptacle 25, and at a position constituting a second station or dwell position 70 of the strainer members 37. A coiled compression spring 71 is disposed within the housing 65 loosely around a part of the armature 68 and has a lower end bearing on the housing bottom and an upper end bearing against a collar 72, fixed to the armature, for supporting said armature and the discharge head 69 in a raised position above and out of engagement with the strainer member 37, disposed at the station 70.

A boiler 73 containing water 74 is supported in the cabinet 21 on the bottom 26 and has a lower water conduit 75 leading from adjacent the bottom of the boiler, and an upper steam conduit 76 leading from the upper part of the boiler, above the level of the water 74. The opposite ends of the conduits 75 and 76 discharge into the discharge head 69, as seen in Figure 2, and said conduits 75 and 76, adjacent said discharge ends thereof, are provided with normally closed solenoid actuated valves 77 and 78, respectively. The conduits 75 and 76 are also provided with flexible portions 79 to permit the discharge ends thereof to move upwardly and downwardly with the discharge head 69.

A pipe 80, as seen in Figure 4, leading from a source of water supply under pressure, extends into the cabinet 21, preferably through its rear wall 81 and has three branch conduits 82, 83 and 84 disposed within the cabinet 21. The branch conduit 82 supplies water to the boiler 73, as clearly illustrated in Figure 17, and as will hereinafter be more fully described. The branch conduit 83 discharges into the upper part of the discharge head 69 and is provided with a normally closed solenoid actuated valve 85. The branch conduit 83 is also flexible to accommodate the up and down movement of the discharge head 69.

A conduit 86 is provided with a flared and recessed upper end 87, as best seen in Figure 7. Said conduit 86 is supported by a bracket 88 which is secured to the waste receptacle 25 and to said flared upper end 87, as seen in Figure 2. An abutment member 89, as seen in Figure 7, is fixedly mounted within the conduit portion 87 by a supporting bracket 90 and has recessed sides in which rollers 91 are journaled. Portions of the chains 35 of the upper flight of the endless conveyor ride on the rollers 91. The abutment member 89 provides a rigid support for the strainer member 37 at the second station or dwell point 70 and said abutment member 89 has bores 92 extending vertically therethrough. Each strainer member 37 has a concave or dished upper side forming a cup 93 which is provided with a perforated bottom 94.

The discharge head 69 is hollow to define a chamber 95 into which the conduits 75, 76 and 83 discharge and which has a perforated bottom 96. The discharge head 69 supports a downwardly extending gasket 97 which surrounds the perforated bottom 96 and which projects downwardly below the level thereof.

An electric motor 98 is supported by the upper part of the waste receptacle 25 and a rotary brush or scraper 99 is supported and rotatably driven by the armature shaft of the motor 98 and is disposed within the upper end of the receptacle 25 adjacent the end of the endless conveyor 28, which extends into said receptacle, and is disposed at a station or dwell position 100 of the endless conveyor. At the station 100 the strainer member 37 is disposed at the end of the endless conveyor with its plane in an upright position, as seen in Figure 2, and a portion of the periphery of the brush 99 extends into the cup 93 of the strainer member which is located at the station 100. The other end of the third branch conduit 84 discharges downwardly and toward the cup 83 of said strainer member, and said conduit 84 is also provided with a normally closed solenoid actuated valve 101. A resilient or yieldable brush cleaning member 102 is supported within the receptacle 25 for cleansing the parts of the brush moving out of engagement with the cup 93, said brush being revolved counter-clockwise as seen in Figure 2 for directing the waste material 103 from the strainer member 37 downwardly and toward a removable open top container 104, which is contained in the bottom of the receptacle 25.

Figures 3, 11:
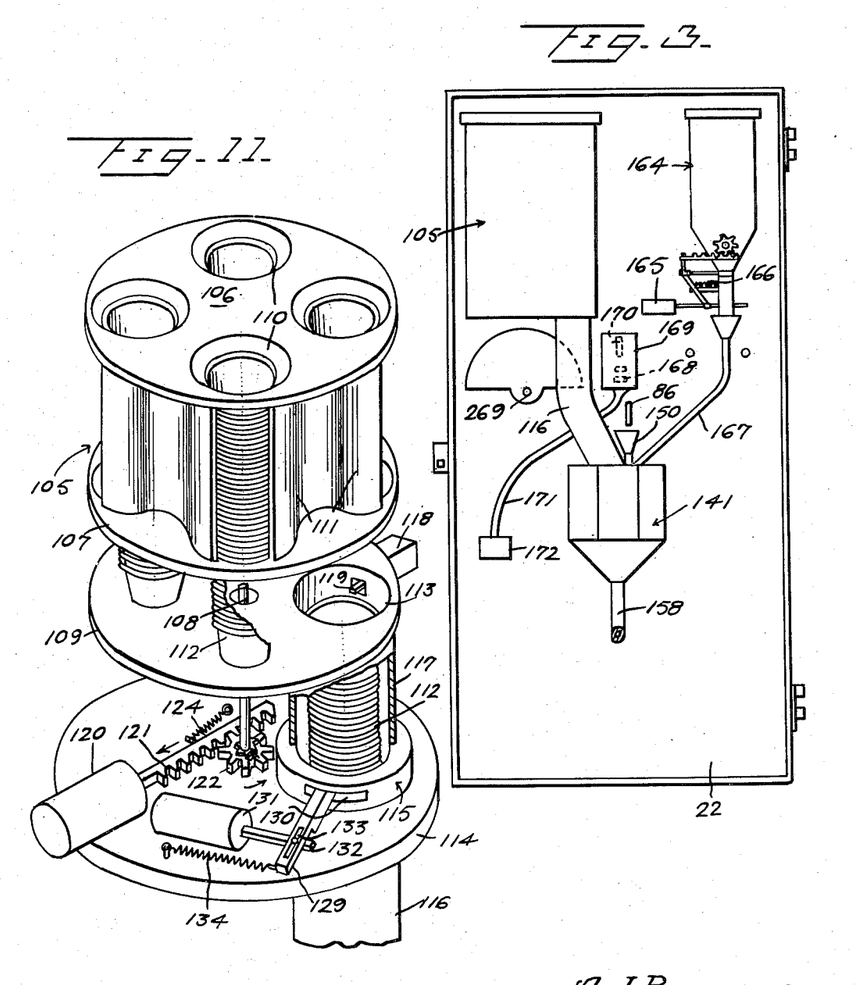
Figure 3 is an elevational view looking toward the inner side of the cabinet front wall and showing the parts carried thereby.
Figure 11 is an enlarged fragmentary perspective view, partly in vertical section, and partly broken away, illustrating still another part of the apparatus.

Referring to Figures 3 and 11, the inner side of the cabinet front wall 22 supports a holder and dispenser 105 for disposable drinking receptacles, and which is best illustrated in Figure 11. Said holder and dispenser 105 includes vertically spaced discs 106 and 107. A shaft 108 is secured to the centers of said discs and extends downwardly therefrom and is journaled in a third lower disc 109. The discs 106 and 107 have aligned openings 110 and tubes 111 extend between said discs 106 and 107, around the openings 110 to form magazines, each of which is adapted to contain a stack of nested paper drinking cups 112, which extend downwardly from the lower disc 107. The bottommost cup of each cup stack rests slidably upon the disc 109 and which is provided with a single opening 113.

Figure 16:
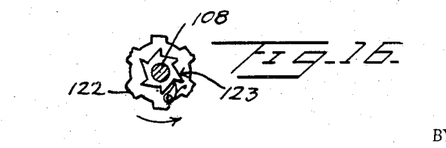
Figure 16 is an enlarged fragmentary view, partly in top plan and partly in horizontal section, of a part of the apparatus illustrated in Figure 11.

A disc 114 is fixedly disposed beneath and spaced from the disc 109 and supports a hollow collar 115 which is fixedly mounted thereon. The collar 115 has a centrally disposed downwardly extending outlet tube or chute 116 which extends downwardly through the disc 114, and a centrally disposed upwardly extending tube 117, the upper end of which terminates against the underside of the disc 109 and around the opening 113 thereof. An electric switch 118 is supported by the disc 109 and has an actuating arm 119 extending into the opening 113. The switch 118 assumes a normally closed position with its actuating arm 119 in a raised position and downward displacement of the arm 119 moves the switch to a circuit interrupting position. The switch 118 is interposed in an electric circuit of a solenoid 120 which is supported on the lower disc 114 and the armature of which forms a rack 121. The rack 121 meshes with a ratchet wheel 122 which is disposed around the shaft 108 and which is connected thereto by a pawl and ratchet unit 123, as seen in Figure 16, which is arranged so that the shaft 108 will be rotated counterclockwise with the ratchet wheel 122, and said ratchet wheel can turn clockwise relative to the shaft 108. A pull spring 124 is connected to the rack 121 and disc 114 to urge said rack outwardly of the solenoid 120 and for turning the ratchet wheel 122 clockwise and relative to the shaft 108. When the solenoid 120 is energized by closing of the switch 118, the rack 121 is drawn inwardly of said solenoid to turn the ratchet wheel 122 and the shaft 108 counterclockwise for rotating the magazines 111 a quarter revolution to position a full magazine in alignment with the opening 113 and so that the stack of cups 112 contained therein will drop downwardly into the tube 117. These cups will engage the actuator 119 to return the switch 118 to an open position to maintain said switch in an open position until the topmost cup of the stack has moved downwardly to below the level of the actuator 119, whereupon the operation previously described will be repeated for recharging the tube 117 with another stack of cups.

Figures 12, 14:
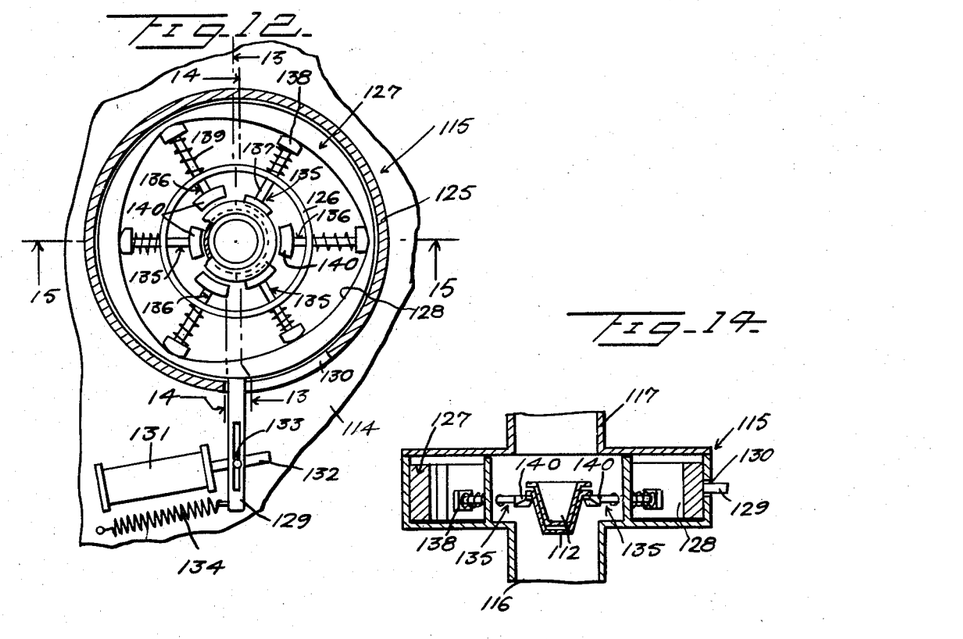
Figure 12 is an enlarged fragmentary horizontal sectional view through a part of the structure disclosed in Figure 11.
Figures 14 and 15 are similar views taken substantially along planes as indicated by the lines 14—14 and 15—15, respectively, of Figure 12.

Referring particularly to Figure 12, the hollow collar 115 includes an outer annular wall 125 and an inner annular wall 126, which walls are concentrically disposed relative to the axis of the collar. An annular member 127 is turnably mounted within the collar 115 against the outer wall 125 and spaced from the inner wall 126 and has an inner cam surface 128, three equally spaced portions of which are located nearer the periphery of the collar than the remainder of said inner surface, as seen in Figure 12. A lever arm 129 is fixed to the ring 127 and extends outwardly therefrom through a circumferentially elongated slot 130 of the outer wall 125. A solenoid 131 is fixed to the disc 114 and has an armature 132 which is urged outwardly thereof when the solenoid is energized. The armature 132 is connected to the lever 129 by a pin and slot connection 133, wherein the slot is formed in the lever 129, for turning said lever and the ring 127 counterclockwise as seen in Figure 12. A pull spring 134, anchored to the disc 114 and connected to the outer end of the lever 129, moves said lever and ring 127 in the opposite direction or clockwise.

The collar 115 contains a first set of cup releasing members 135 and a second set of cup releasing members 136 which extend and are slidably mounted radially of said collar, and each of which set includes three such members with the members of the two sets alternately arranged. Each such cup releasing member 135 and 136 includes a rod 137 which is slidably mounted in the inner ring 126 and which has a head 138 at its outer end which bears against a part of the cam surface 128. Each rod 137 carries a coiled spring 139, between the ring 126 and head 138 for urging said member 135 or 136 radially outward. The inner end of each rod 137 carries a transversely extending arcuate blade 140. The members 135 are disposed below the level of the members 136, as seen in Figures 13 and 15.

Figure 8:
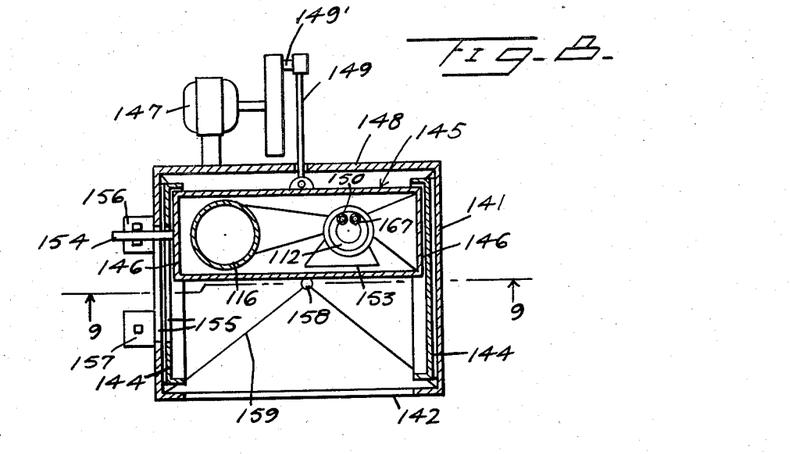
Figure 8 is an enlarged horizontal sectional view, taken through still another part of the apparatus and substantially along a plane as indicated by the line 8—8 of Figure 9.
Figures 9, 10:
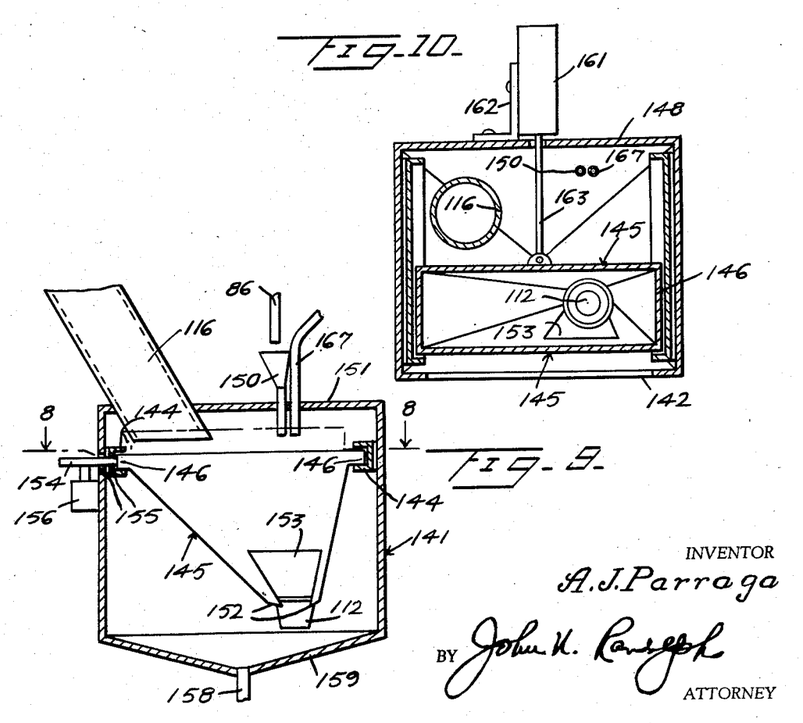
Figure 9 is a vertical sectional view taken substantially along the line 9—9 of Figure 8.
Figure 10 is a view taken along the same plane as Figure 9, illustrating a different position of certain of the parts and a slight modification of the structure as disclosed in Figures 8 and 9.
Figures 13, 15:
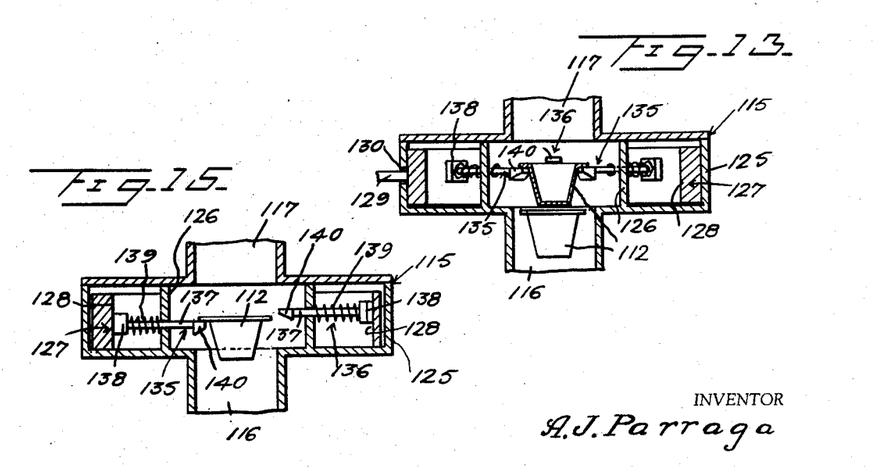
Figure 13 is a fragmentary sectional view, taken substantially along a plane as indicated by the line 13—13 of Figure 12.

When the ring 127 is held by the tension of the spring 134 positioned as seen in Figures 12 to 15, with the cup releasers 135 held displaced inwardly by engagement of their heads 138 with spaced portions of the cam surface 128 which are disposed nearest the inner wall 126, the lowermost cup of the stack extending through the tube 117 will be supported by the blades 140 of said cup releasers 135. In this position of the parts, the upper cup releasing members 136 are held in outwardly retracted positions by their spring 139 with their heads 138 engaging the three depressions of the cam surface 128, as seen in Figures 12 and 15. When the solenoid 131 is energized to turn the ring 127 counterclockwise, the cup releasers 135 move into alignment with the three depressions of the cam surface 128 and are retracted outwardly by their springs 139 to release the bottommost cup 112. At the same time, the cup releasers 136 are projected inwardly by their heads 138 being engaged by the innermost portions of the cam surface 128 to cause the blades 140 thereof to enter between the rims of the bottommost and next to the bottommost cups 112, as the blades 140 of the lower cup releasers 135 are retracted from beneath the rim of the bottom cup. Thus the bottom cup is released and the stack of cups is supported by the upper set of cup releasers 136. When the solenoid 131 is then deenergized the spring 134 returns the parts to their positions of Figure 12 and the blades 140 of the lower cup releasers assume positions to engage under the rim of the bottom cup as the blades of the upper cup releasers 136 are extracted from beneath said cup rim to allow the stack of cups to drop downwardly slightly and resume a position again supported by the lower cup releasers 135. In this manner the cups are released and discharged one by one by gravity through the chute 116 into the top of a receptacle 141 into which the chute 116 discharges. Said receptacle 141 is likewise supported by the inner side of the front wall 22 and has a front wall opening 142 disposed in registration with an opening 143 of the front cabinet wall 22. The container 141, as seen in Figures 8 and 9, contains guide channels 144 which are secured to side walls thereof located at right angles to the opening 142. An elongated open top cup holder 145 has end extensions 146 slidably engaging the channels 144 for mounting the holder 145 for sliding movement in the container 141 toward and away from the open front wall 142. A motor 147 is mounted externally of the rear wall 148 of the container 141. Said motor drives a crank 149' which is connected by a rod 149 to the holder 145, as seen in Figure 8, for moving the holder from a retracted position, adjacent the rear wall 148 to a forward position adjacent the opening 142. A portion of the open top of the holder 145 is disposed beneath the discharge end of the chute 116, when the holder is in its retracted position, and the discharge end of a funnel 150 is disposed above another part of the holder 145, when the holder is in its rearmost position of Figure 8. Said funnel 150 is supported by the top wall 151' of the container 141 and the flared upper end of the funnel is disposed beneath the outlet end of the conduit 86, when the front wall 22 is latched in a closed position.

The holder 145 tapers downwardly and toward the end thereof located beneath the funnel 150 and has a bottom opening forming claws 152 for suspending a cup 112 in the open bottom of the holder 145. The holder 145 has a front wall opening 153 extending upwardly from its bottom opening. The claws are disposed to support a cup 112 directly beneath the discharge end of the funnel 150, as seen in Figure 8.

One end of the holder 145 has a rod 154 projecting outwardly therefrom through an elongated slot in the channel 144 which supports said end 146 and through an aligned slot of the adjacent wall of container 141. Said slots 155 are best seen in Figure 8. Two electric switches 156 and 157, which are interposed in the circuit of the motor 147, are mounted on the exterior of the container 141 at the end of the slots 155, to be alternately engaged by the rod 154.

A drain conduit 158, as seen in Figure 9, extends from the bottommost part of the dished bottom 159 of container 141. The outlet end of the drain conduit 158 discharges into the waste receptacle 25 through a lipped opening 160 thereof, which is located above and adjacent the receptacle 104.

Figure 10 illustrates a slight modification of the structure shown in Figures 8 and 9, and wherein the slots 155 and switches 156 are omitted and a double acting solenoid 161 replaces the motor 147 and crank 149' and is supported on the outer side of the rear wall 148 by a bracket 162. The armature 163 of the solenoid 161 extends reciprocably through the wall 148 and is attached to the holder 145.

A dispenser 164, which corresponds in all respects, except possibly as to size, with the dispenser 38, is supported on the inner side of the upper portion of the front wall 22 and has a solenoid 165 and pull spring 166 for intermittently actuating the valves thereof. A conduit 167 of the dispenser 164, corresponding to the conduit 62, discharges through the top of the container 141 directly above the cup 112 supported in said holder and when the holder is in its rearmost position of Figures 8 and 9.

A normally open electric switch 168 is mounted on the inner side of the front wall 22 in a box 169 and beneath a coin slot 170 of said front wall, which opens into the box. A tube or conduit 171 extends from the bottom of the box 169 to a collecting receptacle 172.

Figure 17:
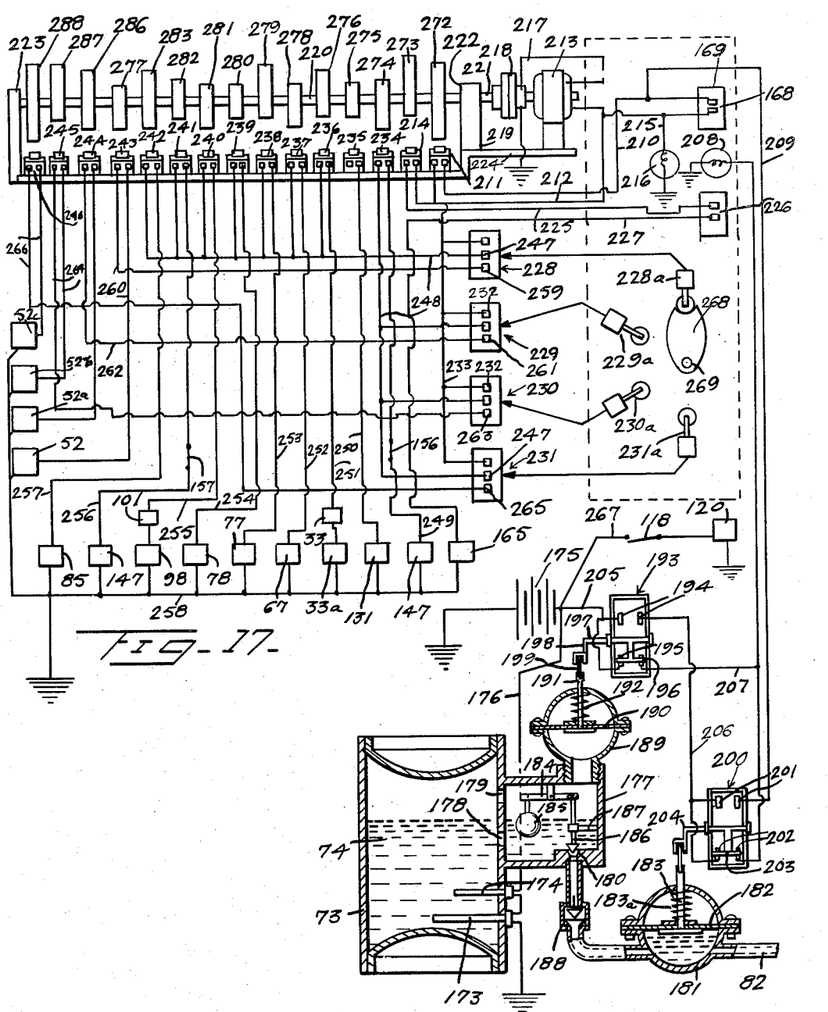
Figure 17 is a view partly in vertical section and partly diagrammatic, illustrating the electrically operated synchronizing mechanism of the apparatus.

Referring to Figure 17, the boiler 73 is provided with a heating element 173 and a thermostat 174 which are interposed in an electric circuit of a current source 175 by a conductor wire 176.

The boiler 73 has a separate chamber 177 connected to the main chamber of the boiler by a lower water port 178 and an upper steam port 179, which are disposed below and above, respectively, the normal water level in said boiler. The branch conduit 82 opens upwardly into the chamber 177 through a valve seat 180. Said conduit 82 has an enlargement 181 a portion of which is formed by a diaphragm 182. A rod 183 projects outwardly from the diaphragm 182 and carries a compression spring 183a which urges the diaphragm 182 inwardly or downwardly against the water pressure within the part of the enlargement 181 which communicates with the conduit 82.

A lever 184 is suspended intermediate of its ends for rocking movement within the chamber 177 and has a float 185 suspended from one end thereof and a valve 186 suspended from the opposite end of said lever and extending through a guide 187 for closing the valve seat 180 when a proper water level exists in boiler 73 and chamber 177. When this water level falls the float 185 opens valve 186 so that water can be supplied automatically to boiler 73 and chamber 177. A check valve 188, which opens toward the chamber 177 and is disposed in the conduit 82, between its enlargement 181 and said chamber 177, allows a flow of water to the boiler but prevents a backflow therefrom.

A steam chamber 189 is supported on and opens downwardly into the chamber 177 and, like the enlargement 181, has a diaphragm 190 at the upper end thereof provided with an upwardly extending rod 191, and which diaphragm is urged downwardly by a compression spring 192.

A double throw switch 193 has a pair of contacts 194 and a pair of contacts 195. A conductor bridge 196 of the switch 193 is swingably supported by a shaft 197 to engage either the two contacts 194 or the two contacts 195. The shaft 197 is connected by a crank 198 and a connecting rod 199 to the diaphragm rod 191, the connecting rod 199 being pivoted to the rod 191 and to the crank 198.

A switch 200, of the same construction as the switch 193, has a pair of contacts 201 and a second pair of contacts 202. The contacts of each pair are selectively engaged by a bridge 203 which is operatively connected to the diaphragm rod 183 by a shaft, crank and connecting rod unit 204 of the same construction as previously described in connection with the switch 193. Contacts 194 and 195 are connected to the current source 175 by wiring 205. The other contact 194 is connected to one contact 201 and a contact 202 by wiring 206. The other contact 195 and the other contact 202 are each connected by wiring 207 to a light bulb 208 which is mounted on the cabinet front wall 22 to indicate that the apparatus is out of order. Accordingly, if there is insufficient steam pressure in the chamber 189 to hold the diaphragm 190 distended outwardly and so that the spring 192 will hold the conductor bridge 196 in its position of Figure 17, engaging the contacts 195, the light bulb 208 will be energized to visually indicate that the apparatus 20 is out of order. If, on the other hand, the bridge member 196 is engaging the contacts 194, due to the diaphragm 190 being bulged outwardly or upwardly, and the bridge member 203 is in its position of Figure 17, due to there being insufficient pressure in the water line 82 to bulge or expand the diaphragm 182 outwardly or upwardly, the light bulb 208 will still be maintained energized.

If both diaphragms 182 and 190 are bulged outwardly so that the conductor 196 is bridging the contacts 194 and the conductor 203 is bridging the contacts 201, current will flow through said contacts and through a conductor wire 209 to a conductor wire 210. Conductor wire 210 connects one contact of a switch 211 to one contact of the switch 168. The other contact of the switch 211 is connected by a wire 212 to one post of an electric motor 213 and to one contact of an electric switch 214, and also to the other contact of the switch 168. A wire 215 leads from the wire 212 to a light bulb 216 which is also mounted on the front cabinet panel 22. A wire 217 leads from the other post of the motor 213 to a magnetic clutch 218 which is grounded by a wire 219. A shaft 220 is coupled to a motor shaft 221, in which the magnetic clutch 218 is interposed, by a reduction gearing 222. The motor 213, reduction gearing 222 and a bearing 223 are supported by a supporting bar or panel 224, which is supported by the refuse receptacle 25 and cabinet wall 32, as best seen in Figure 2. The shaft 220 is supported and journaled by gear reduction 222 and bearing 223. The other wire 225 of switch 214 connects with one contact of a manually operated switch 226 which is also mounted on the front panel 22 and the other wire 227 of the switch 226 is connected to the solenoid 165.

Four triple contact switches 228, 229, 230 and 231 are mounted on the front panel 22 and each includes a first contact 232. The contacts 232 are each connected by a wiring 233 to the wire 212. The support 224 mounts the switches 211 and 214 and a plurality of additional switches 234, 235, 236, 237, 238, 239, 240, 241, 242, 243, 244, 245, and 246, all of which switches are disposed in alignment and beneath the shaft 20, and each of which has two contacts and constitutes a normally open switch. A second contact 247 of each of the switches 228, 229, 230 and 231 is connected by a wiring 248 to one contact of each of the switches 234, 235, 236, 237, 238, 239, 240, 241 and 242. The other contact of the switch 234 is connected by a wire 249 to one pole of the reversible motor 147 and has the normally closed switch 156 interposed therein. Alternately, the wire 249 can be connected to one winding of the double acting solenoid 161, in which case the switch 156 is omitted. The other contact of the switch 235 is connected by a wire 250 to the solenoid 131. The other contact of the switch 236 is connected by a wire 251 to the electric motor 33. The other contact of the switch 237 is connected by a wire 252 to the solenoid 67. The other contact of the switch 238 is connected by an electric wire 253 to the solenoid of the valve 77. The other contact of the switch 239 is connected by a wire 254 to the solenoid of the valve 78. The other contact of the switch 240 is connected by a wire 255 to the solenoid of the valve 101 and to the motor 98. The other contact of the switch 241 is connected by a wire 256 to another contact of the reversible motor 147 and has the other normally closed switch 157, interposed therein. Alternately, the wire 256 may connect with the other winding of the double acting solenoid 161 and have the switch 157 omitted therefrom. The other contact of the switch 242 is connected by a wire 257 to the solenoid of the valve 85. The parts 165, 147, 131, 33, 67, 77, 78, 101, 98 and 85 are grounded by wiring 258. The third contact 259 of the switch 228 is connected by a wire 260 leading to the solenoid 52 and in which the switch 243 is interposed. The third contact 261 of the switch 229 is connected by a wiring 262 to a solenoid 52a, in which wiring the switch 244 is interposed. The third contact 263 of switch 230 is connected by a wiring 264 to a solenoid 52b, and in which wiring the switch 245 is interposed. The third contact 265 of switch 231 is connected by a wiring 266 to a solenoid 52c, in which wiring the switch 246 is interposed. The solenoids 52, 52a, 52b and 52c are grounded by the wiring 258.

The solenoid 120 and switch 118 are interposed in a separate grounded circuit 267 of the current source 175.

Figure 1:
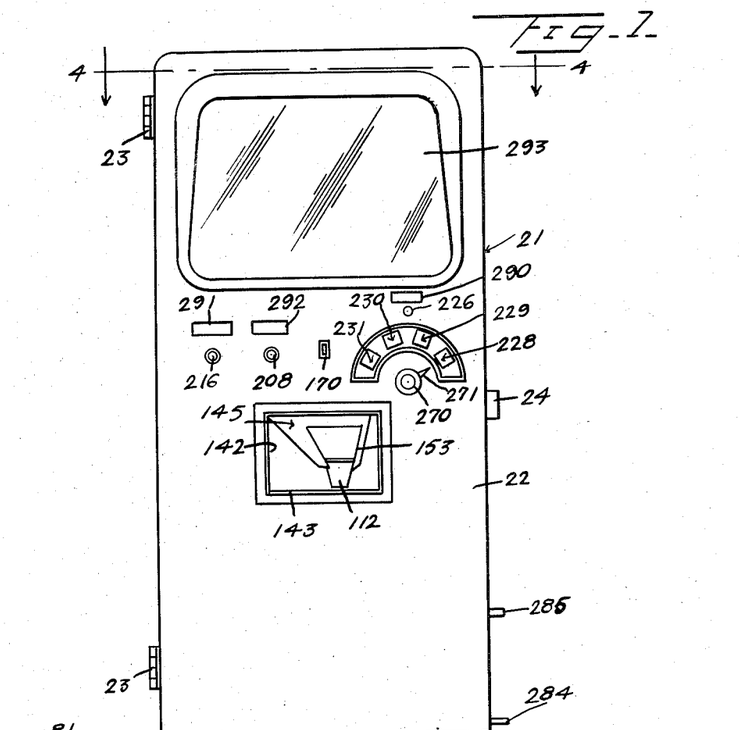
Figure 1 is a front elevational view of the beverage making and dispensing apparatus.

The switches 228, 229, 230 and 231 have push type actuators 228a, 229a, 230a and 231a, respectively, for closing said switches and which are selectively engaged by a manually actuated cam member 268 which is fixed to the inner end of a shaft 269 which extends through and is journaled in the cabinet front wall 22. A knob 270 having a pointer 271 is fixed to the outer end of said shaft, as seen in Figure 1. The pointer 271 is shown pointing toward the switch 228 so that the cam 268 is in engagement with the switch actuator 228a, as seen in Figure 17, for maintaining the switch 228 in a closed position.

The shaft 220 supports a plurality of cams of different sizes and shapes which are disposed over the switches supported by the panel 224 and which are arranged to move into and out of engagement with said switches as the shaft 220 makes one complete revolution when the motor 213 is energized.

Assuming that the diaphragms 182 and 190 are expanded upwardly or outwardly so that the apparatus 20 is in condition for operation, when a coin is deposited in the slot 170 it will momentarily strike and close the switch 168 so that current will be supplied to the motor 213, clutch 218 and the light bulb 216. When this occurs, the shaft 220 will be turned sufficiently to move a cam 272 thereof into engagement with the switch 211 for closing said switch. The switch 168 will then resume an open position by the coin moving out of contact therewith but the circuit to the motor 213 and clutch 218 as well as to the light bulb 216 will be retained through the switch 211 with the current passing through the wire 210, through switch 211 and through wire 212 to the motor 213. Further movement of the shaft 220 will cause the switch 214 to be closed by a cam 273. While switch 214 is closed the manual switch 226 may be moved to a closed position for actuating the solenoid 165 so that the equivalent of a spoonful of sugar can be dispensed from the sugar hopper 164 through the conduit 167 into the cup 112 which is supported in the holder 145. The switch 226 may be operated more than once for discharging more than one regulated amount of sugar during each cycle of operation of the apparatus. The switch 234 is closed by a cam 274, prior to closing of the switch 214, so that the motor 147 will turn the crank 149' in a direction to exert a pull on the rod 149 and holder 145 to position said holder in its rearmost position as shown in Figure 8, with cup 112 contained therein disposed beneath the outlets of the conduit 167 and the funnel 150, at the time that the sugar can be dispensed by the solenoid 165 being energized. The switch 156 breaks the circuit to the motor 147 when the holder 145 reaches its position of Figure 8. A cam 275 of the shaft 220 closes the switch 235 to energize the solenoid 131 so that a cup 112 is released through the chute 116 into the holder 145, immediately after the switch 234 has been closed, and before closing of the switch 214. A cam 276 of the shaft 220 closes the switch 236 for energizing the motor 33 and the clutch and brake means 33a, after the cam 277 has closed the switch 243 for energizing the solenoid 52. When the solenoid 52 is energized a charge of ground coffee is released from the hopper 38 through the conduit 62 into the cup portion 93 of the strainer member 37 which is disposed at the station 64. Thereafter the endless conveyor 28 is moved by the motor 33 and clutch and brake means 33a being energized, for moving said strainer member 37 from station 64 to the second station 70. The cam 276 moves out of engagement with the switch 236 to break the circuit to the motor 33 and clutch and brake means 33a at the time that said strainer member 37 reaches the second station. The clutch and brake means 33a insures movement of the endless conveyor 28 a distance corresponding to the spacing between stations 64 and 70 or 70 and 100 each time that the switch 236 is closed. If desired, the hopper 38 may contain a mixture of sugar and ground coffee, not shown. A cam 278 of the shaft 220 closes the switch 237 to energize the solenoid 67, as the motor 33 is de-energized, for forcing the discharge head 69 downwardly into sealing engagement with the strainer member 37 located at station 70, the connection of said parts being sealed by the gasket 97. A cam 279 of the shaft 220 then closes switch 238 momentarily to energize solenoid 77 and open the valve thereof to admit hot water to the chamber 95 from the conduit 75. Immediately thereafter, a cam 280 of the shaft 220 momentarily closes the switch 239 to energize solenoid 78 for opening the valve thereof to admit steam to the chamber 95 from the conduit 76, for superheating the hot water and for forcing it through the perforated bottom 96, the coffee grounds, the perforated bottom 94, and bores 92 into the conduit 86 through which it is conveyed and discharged by gravity into the cup 112, which is supported as shown in Figure 8 by the cup holder 145.

The switch 237 then is opened to de-energize solenoid 67 so that spring 71 can lift discharge head 69 out of engagement with said strainer member 37. The cam 276 then again closes the switch 236 to effect another movement of endless conveyor 28 so that said strainer member 37 will move to station 100, at which time the switch 236 will again resume an open position.

A cam 281 of the shaft 220 closes the switch 240 to energize the solenoid valve 101 and motor 98, immediately after the motor 33 has been de-energized the second time, so that the strainer member 37 which is moved from station 70 to station 100 can be washed by the jet of water from the tube 84 and cleaned by the brush 99. The coffee grounds 103 therefrom are deposited in the receptacle 104. A cam 282 of the shaft 220 closes the switch 241 to re-energize the motor 147 in the reverse direction so that the cup holder 145 will move to its forwardmost position of Figure 10. As the cup holder reaches its forwardmost position the switch 157 is opened by contact of the rod 154 therewith to break the circuit of the motor 147. The switch 156 resumes a closed position as the rod 154 moves forwardly out of engagement therewith. The other winding of the solenoid 161 could be energized by closing of the switch 241 for effecting forward motion of the cup holder 145.

After the holder 145 has moved forward and at the same time that the cleansing action is occurring at station 100, a cam 283 closes the switch 242 to momentarily energize the solenoid of the valve 85 to supply cleansing water to the chamber 95. This occurs while no strainer member 37 is located at station 70. The cleansing water passes through the bores 92 and conduit 86, for cleansing said bores and conduits, and is discharged into the container 141 through the funnel 150, which is also thus cleansed. The cleansing water is discharged behind the cup holder 145, which is in its forwardmost position of Figure 10, and flows from the container 141 through the drain pipe 158 into the refuse receptacle 25 through the lipped opening 160, as seen in Figure 2. The refuse receptacle 25 has a lower drain pipe 284 and an upper drain pipe 285 leading therefrom through the cabinet wall 27, by means of which the liquid from the pipe 158 and tube 84 can be drained from the apparatus. The strainer member 37, shown at the underside of the endless conveyor 28, in Figure 2, moves to station 64, the second time that the converter 28 is actuated; and the strainer member 37, shown at station 100, moves to a position at the underside of the endless conveyor 28.

Instead of a single hopper 38 and its associated parts, the apparatus 20 can include four such hoppers 38 and the parts associated therewith, the other three of which would include the solenoids 52a, 52b and 52c in lieu of the solenoid 52. The hopper, associated with the solenoid 52a, may contain a mixture of ground coffee and powdered cream to be dispensed into the strainer member at station 64, at the election of the user, by turning the knob 270 to direct the pointer 271 toward the switch 229, so that the cam 268 will engage the actuator 229a for closing the switch 229, rather than the switch 228. If the knob 270 is turned to position the pointer 271 directed toward the switch 230 the actuator 230a will be engaged by the cam 278 and the switch 230 will be closed. This will result in the solenoid 52b being energized due to the cam 287 contacting the switch 245, whereas when the switch 229 was closed the cam 286 of the shaft 220 engaged and closed the switch 244 to complete the circuit to the solenoid 52a. The hopper associated with the solenoid 52b may contain the dry ingredients for hot chocolate to be discharged into the strainer member disposed at station 64. Similarly, if the cam member 268 engages the actuator 231a to close switch 231, the solenoid 52c will be energized when a cam 288 engages the switch 246 to supply dry tea to the strainer member at station 64.

The cabinet 21 may be provided with suitable ventilating openings 289, as seen in Figure 2.

The switches 228, 229, 230 and 231 may be suitably marked to designate the beverage controlled by each. A panel portion 290 of the cabinet front wall 22 may contain suitable indicia to indicate that the switch 226, located therebeneath, is manually actuated for dispensing extra sugar while the bulb 216 is energized to indicate that the apparatus is in operation and to also indicate that another coin should not be deposited in the slot 170 while said bulb remains illuminated. A panel 291 above the bulb 216 may contain this information, and a panel 292 above the bulb 208 will contain indicia indicating that no coin should be deposited when this bulb is energized because the apparatus is out of order. A large upper panel 293 of the wall 22 may contain any suitable indicia pertinent to the apparatus 20. An access door 294 is provided in the waste receptacle 25.

It will be understood that when the holder 145 is displaced forwardly that the user can remove the full cup 112 through the openings 142 and 143 by lifting upwardly on said cup and removing it from the opening 153 and thence through the openings 142 and 143.

Various modifications and changes are contemplated and may be resorted to, without departing from the function or scope of the invention as hereinafter defined by the appended claims.

I claim as my invention:

1. A beverage dispenser comprising an endless conveyor, means for intermittently driving said endless conveyor, a plurality of strainers fixed to and carried by the endless conveyor, a container for a dry beverage mixture disposed above a dwell position of said strainers, intermittently actuated dispensing means associated with said container for dispensing a predetermined quantity of the beverage mixture into the strainer disposed beneath said container, a water discharge head having a chamber provided with a perforated bottom and a sealing means surrounding said perforated bottom, a source of water supply connected to said discharge head, valve means controlling the supply of water to said discharge head, means reciprocably supporting said discharge head above the next dwell position of the strainers, said supporting means being intermittently operated for displacing the discharge head downwardly into sealing engagement with the strainer disposed therebeneath immediately prior to the charging of the head thereof with water, and a conduit having an enlarged upper inlet end disposed directly beneath the strainer, in the last mentioned dwell position thereof for receiving the liquid beverage mixture from said strainer, said conduit having a lower outlet end adapted to be disposed above a drinking receptacle.

2. A beverage dispenser as in claim 1, a plurality of additional containers each adapted to contain a different beverage mixture in dry form and each having a discharge end disposed above the dwell position of the strainers, located in a preceding position relative to said discharge head, an intermittently operated dispensing means for discharging a regulated amount of the dry mixture associated with each of said additional containers, and a manually controlled selector means manually adjustable for selectively operating one of said dispenser means for dispensing a selected beverage mixture into the strainer.

3. A beverage dispenser as in claim 1, said source of water supply including a boiler, and heating means for heating the water contained in the boiler and supplied therefrom to the chamber of said discharge head.

4. A beverage dispenser as in claim 3, a steam conduit leading from an upper part of said boiler and discharging into said chamber of the discharge head, and an intermittently operated valve controlling said steam conduit for releasing the steam into the chamber after the chamber has been charged with water for superheating the water and pressurizing said chamber.

5. A beverage dispenser as in claim 1, a stationary perforated support disposed between the inlet end of said conduit and said discharge head for supporting the strainer engaged by the discharge head.

6. A beverage dispenser as in claim 5, and means for supplying a charge of cleansing water under pressure to said discharge head after the drinking receptacle has been removed from beneath the outlet end of said conduit for rinsing the perforated support and conduit.

7. A beverage dispenser as in claim 1, a waste receptacle in which an end of said endless conveyor is disposed, said endless conveyor having a third dwell position of the strainers disposed within said waste receptacle to which the strainers move after passing from beneath said discharge head and wherein the strainers are partially overturned relative to their positions at the first mentioned and second mentioned dwell positions, and intermittently operated brush and water supply means for cleansing each strainer in the third dwell position thereof.

8. A beverage dispenser as in claim 1, a sugar container, intermittently operated dispensing means associated with said sugar container for dispensing a predetermined quantity of sugar therefrom, and a conduit disposed to receive the sugar from said sugar container and having an outlet end disposed adjacent the outlet end of the beverage conduit and from which the sugar is dispensed into said drinking receptacle.

9. A beverage dispenser as in claim 8, and manual control means for regulating operation of the intermittently operated dispensing means of the sugar container.

10. A beverage dispenser as in claim 1, a drinking receptacle holder and dispenser including a magazine containing a plurality of drinking cups and intermittently operated means for intermittently releasing a cup from said magazine, and a cup holder into which the dispensed cup is discharged by gravity having means for supporting the cup in an upright position beneath the outlet end of said beverage conduit and having a front wall provided with an opening from which the filled cup is adapted to be removed.

11. A beverage dispenser as in claim 10, a cabinet forming a housing for said beverage dispenser elements including a front wall provided with an opening behind which said cup holder is disposed and through which the filled cup is removable.

12. A beverage dispenser as in claim 11, means reciprocably supporting said cup holder for movement toward and away from said front wall, and intermittently actuated means for moving the cup holder from a rearmost position in which the cup is received and supported beneath said beverage conduit outlet to a forwardmost position in which the filled cup is disposed adjacent said front wall opening.

13. A beverage dispenser as in claim 12, said intermittently operated means being electrically controlled, and an electrically driven synchronizing unit including an electric motor, a shaft rotatably driven by said motor, a plurality of cams supported by said shaft, a plurality of electric switches controlled by said cams and electrically connected to said intermittently driven means for synchronizing the operation of said electrically driven means.

14. A beverage dispenser as in claim 13, a normally open coin actuated switch adapted to be closed by contact of a coin therewith for initially completing an electric circuit to said motor for momentarily energizing the motor to effect movement of one of said cams into engagement with the switch thereof, said switch constituting a holding switch for maintaining the motor circuit closed until said shaft has completed a revolution.

15. A beverage dispenser as in claim 14, means for heating the water supplied to said discharge head, means for supplying steam under pressure intermittently to said discharge head from said heating means, a water pressure responsive switch interposed in the electric circuit of said motor, and a steam pressure responsive switch interposed in the circuit of said motor, said last mentioned switches being maintained in circuit closing position by predetermined water pressure and steam pressure, respectively, either of said last mentioned switches, in an open position, maintaining said motor de-energized.

16. A beverage dispenser as in claim 15, and an electrically operated visual indicator associated with said last mentioned switches and arranged to be illuminated when either of the switches is in a circuit breaking position for visually indicating that the beverage dispenser is incapable of being operated by closing of the coin control switch.

17. A beverage dispenser as in claim 1, said source of water supply including a boiler, heating means for heating the water contained in the boiler and supplied therefrom to the chamber of said discharge head, and means for automatically replenishing the water in said boiler.

No references cited.